Patented Aug. 22, 1950

2,519,673

UNITED STATES PATENT OFFICE 2,519,673

SEPARATION OF HYDRAZOBENZENES FROM ZINC SLUDGE

Hans Z. Lecher, Plainfield, and Glenn S. Watson, Martinsville, N. J., assignors to American Cyanamid Company, New York, N. Y., a corporation of Maine No Drawing. Application January 24, 1946, Serial No. 643,204

5 Claims. (Cl. 260—569)

This invention relates to a process for increasing the particle size of a hydrazobenzene in an aqueous slurry thereof, and more particularly to an aqueous slurry of a hydrazobenzene having the formula:

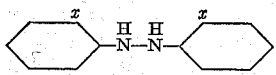

wherein $x$ is a member of the group consisting of the hydrogen, halogen, methyl, ethyl, methoxy and ethoxy radicals.

In the commercial preparation of such hydrazobenzenes, as for example, hydrazobenzene, 2,2'-dichlorohydrazobenzene, 2,2'-dimethylhydrazobenzene, 2,2'-diethylhydrazobenzene, 2,2'-dimethoxyhydrazobenzene and 2,2'-diethoxyhydrazobenzene, a corresponding nitro compound in aqueous suspension is reduced to the hydrazobenzene using metallic zinc and caustic soda. Chemically the process is excellent. Physically it is objectionable in that the resultant slurry contains a mixture of a solid hydrazobenzene and solid zinc oxide which is difficult to separate.

In the past this separation has been attempted by screening, making an incomplete separation of these substances by washing the slurry on a screen. The zinc oxide and the smaller particles of the hydrazobenzene pass through the screen, producing a fairly clean screen oversize concentrate of the coarser crystals of hydrazobenzene.

Because of the wide variation in the crystal size of the hydrazobenzene, a certain amount of smaller particles of the hydrazobenzene will pass through the screen with the zinc oxide. In some batches this loss may run as high as fifteen or more per cent, a very serious loss due to the value of hydrazobenzene. Moreover the by-product zinc oxide, which is also sold in commerce, may become so contaminated as to lose its value for some specialty purposes. The use of a finer screen may reduce losses of the hydrazobenzene somewhat but more time is required for screening and, if too fine a screen is used or the washing is insufficient, certain amounts of zinc oxide will be retained on the screen with the hydrazobenzene. Any zinc oxide remaining with the hydrazobenzene results not only in a loss of zinc oxide but also the waste of acid in the rearrangement of the hydrazobenzene into the corresponding benzidine, in which form the product is usually desired.

To avoid the screening and resultant waste, in some cases no separation is attempted. This is possible because, as noted above, hydrazobenzene is usually not recovered and sold as such, but is rearranged to the corresponding benzidine. This is done in a separate step, using acid. The zinc oxide is eliminated simply by using a large excess of acid to dissolve the zinc oxide during the rearrangement operation. While this avoids losing hydrazobenzene, it is not a satisfactory operation since it not only wastes large quantities of acid but also results in the loss of the zinc oxide which is otherwise readily recovered.

It is then highly important to be able to separate the hydrazobenzene and zinc oxide as completely as possible. In the past this could not be accomplished satisfactorily in commercial practice, despite the need therefor. The problem remained of finding a method of separating the hydrazobenzene from the zinc oxide without excessive loss of the former or conversion of the latter.

It is therefore, the principal object of this invention to provide a method whereby this separation can be easily, quickly and efficiently carried out. Preferably it should be one which is relatively free from loss of the hydrazo product and one which does not result in loss of the zinc oxide by conversion to a non-saleable product. A further object of this invention is to obtain a better yield of hydrazobenzenes and of relatively uncontaminated zinc oxide by reducing losses due to incomplete separation.

According to our invention these and other objects are met by modifying the screen separation process. The aqueous slurry of the hydrazo product and the zinc oxide is specially treated before screening to cause crystal-growth and/or aggregation of the hydrazobenzene without modifying the physical state of the zinc oxide. Subsequently thereto, the treated slurry is wet screened. Not only does the treatment make it possible to use much larger screens than previously used for the incomplete separation but the use of even screens large enough to permit rapid screening produces clean concentrates of both the hydrazobenzene and the zinc oxide.

As has been noted, the particularly efficient results obtained in the process of the present invention are due to the special treatment of the aqueous slurry before the screening operation. This treatment involves our discovery that when the aqueous slurry is heated with a relatively small amount of a suitable water-immiscible organic liquid the smaller particles of the hydrazobenzene are converted into larger crystals or aggregates. The size to which the growth is carried depends both on the amount and on the kind of liquid used as well as on the operating conditions. Under proper conditions the crystal growth or aggregation can be controlled to any desired point. Little expense other than heating is involved since the organic liquid may be readily distilled off and reused.

A variety of insoluble, inert organic liquids may be used, according to the process of this invention to bring about this conversion. The choice among the various possible organic liquids is based on such factors as availability, ease of recovery and efficiency of operation. Organic liquids which have been found to function most satisfactorily are, in general, those which are immiscible with water and which have some wetting or solvent action for the hydrazobenzene. The solvent must also be inert to any alkaline reducing substances present in the slurry. While the invention is not limited to any particular organic liquid, different liquids are operative with varying degrees of efficiency for any particular hydrazobenzene. Without intending to limit the present invention, some typical organic liquids which are operative for hydrazobenzenes in general in this process are the following: benzene, toluene, xylenes, cymenes, lower boiling naphthas, mixed hexanes, heptane, cyclohexane, chlorobenzene, methylene chloride, chloroform, carbon tetrachloride, sym-dichloroethane, dichloroethylene, trichloroethylene, perchloroethylene, sym-tetrachloroethane. For any particular hydrazobenzene, however, it is advisable to select only those organic liquids which form an azeotrope with water that boils at a point below the melting point of the crude hydrazobenzene to be screened. Otherwise the hydrazobenzene may be softened or melted during removal of the solvent and the aggregation altered.

The amount of organic liquid used may vary widely depending on which organic liquid is used, the relative proportion of the smaller suspended particles contained in the original slurry, the size of the final particles desired for optimum efficiency in the screening process, and on the time to be allowed for reflux before distilling off the organic liquid. When a longer reflux time is taken, the amount of organic liquid, may, in general, be decreased. The preferred amount of the selected solvent may be quickly ascertained. Too small a quantity of the organic liquid will not produce optimum results. Too large a quantity not only produces no useful result but increases recovery costs. In no case is the amount required for this process sufficient to dissolve more than a small part of the hydrazobenzene contained in the slurry. This process is, therefore, to be distinguished from any process in which the hydrazobenzene is substantially dissolved in an organic solvent.

This invention may be illustrated by the following examples, all parts being parts by weight.

*Example 1*

Eight hundred parts of nitrobenzene and 50 parts of sodium hydroxide are added to 1100 parts of water in a reaction vessel equipped with a condenser which can be used for refluxing or for distilling from the vessel. The mixture is stirred and heated to 80° C. and the nitrobenzene is reduced by the gradual addition of 1250 parts of powdered zinc. During the reduction the temperature is maintained at 78–80° C. and the mixture is allowed to reflux. The resulting aqueous slurry of zinc oxide and hydrazobenzene is diluted to approximately 5000 parts. It is then divided into two equal parts.

Part 1: 50 parts of chlorobenzene is added to one-half of the slurry and the mixture is stirred 4 hours at 95–100° C. under reflux, after which the condenser system is adjusted for distillation and the chlorobenzene is allowed to distill from the mixture at 95–100° C. The slurry is then washed with water consecutively through a series of U. S. Standard sieves consisting of sieves numbered 20, 40, 60, 80 and 100. The per cent of the yield of hydrazobenzene on each of the sieves and that passing through sieve No. 100 is determined to be as follows:

| Sieve No. | Per Cent of Total Hydrazobenzene |
|---|---|
| 20 | 47.0 } 96.3 |
| 40 | 49.3 |
| 60 | 2.7 |
| 80 | .7 |
| 100 | .2 |
| Through sieve No. 100 | .1 |

Part 2: One-half of the slurry is treated as above except that no chlorobenzene is added. The per cent of the total yield of hydrazobenzene retained on each of the sieves and that passing through sieve No. 100 is determined to be as follows:

| Sieve No. | Per Cent of Total Hydrazobenzene |
|---|---|
| 20 | 1.7 } 23.2 |
| 40 | 21.5 |
| 60 | 37.9 |
| 80 | 18.5 |
| 100 | 12.5 |
| Through sieve No. 100 | 7.9 |

*Example 2*

Eight hundred parts of nitrobenzene is reduced to hydrazobenzene as in Example 1 and the resulting aqueous slurry of hydrazobenzene and zinc oxide is divided into three equal parts.

Part 1: 30 parts of toluene is added to one-third of the slurry and the mixture is stirred 2 hours at 90–95° C. under reflux after which the toluene is distilled from the mixture during an additional stirring period at 90–95° C. The slurry is then washed with water consecutively through a series of U. S. Standard sieves consisting of sieve numbers 40, 60 and 80. The per cent of the total yield of hydrazobenzene retained on each of the sieves and that passing through sieve No. 80 is determined to be as follows:

| Sieve No. | Per Cent of Total Hydrazobenzene |
|---|---|
| 40 | 96.6 |
| 60 | 2.6 |
| 80 | .5 |
| Through sieve No. 80 | .3 |

Part 2: One-third of the slurry is treated as in Part 1 except that 30 parts of n-heptane is substituted for the toluene and a temperature of 80–85° C. is substituted for 90–95° C.

| Sieve No. | Per Cent of Total Hydrazobenzene |
|---|---|
| 40 | 39.5 |
| 60 | 38.1 |
| 80 | 14.0 |
| Through sieve No. 80 | 8.3 |

Part 3: One-third of the slurry is treated as in Part 1 except that no organic liquid is added.

| Sieve No. | Per Cent of Total Hydrazobenzene |
|---|---|
| 40 | 15.7 |
| 60 | 36.2 |
| 80 | 26.4 |
| Through sieve No. 80 | 21.7 |

*Example 3*

157.5 parts of o-chloronitrobenzene is stirred at 75–85° C. and is reduced by the gradual addition of 190 parts of powdered zinc and 28 parts of sodium hydroxide dissolved in 450 parts of water, this addition extending over a period of about 8 hours. During the reduction the temperature is maintained at 75–85° C. and the mixture is allowed to reflux. When reduction is complete the mixture is distilled with steam to remove some o-chloroaniline which is formed as a by-product in the reduction and the resulting aqueous slurry of 2,2'-dichlorohydrazobenzene and zinc oxide is diluted with water to 1500 parts and divided into two equal parts.

Part 1: One-half of the slurry is cooled to 40° C. 20 parts of methylene chloride is added and the mixture is stirred under reflux for 6 hours at 40–45° C. after which the methylene chloride is distilled from the mixture during an additional one hour stirring period at 40–50° C. The slurry is then washed with water through a series of U. S. Standard sieves. The per cent of the total yield of 2,2'-dichlorohydrazobenzene retained on each of the sieves and that passing through sieve No. 100 is determined to be as follows:

| Sieve No. | Per Cent of Total 2,2'-Dichlorohydrazobenzene |
|---|---|
| 40 | 77.3 |
| 60 | 12.3 |
| 80 | 2.5 |
| 100 | 1.3 |
| Through Sieve No. 100 | 6.6 |

Part 2: One-half of the slurry is treated as in Part No. 1 except that no methylene chloride is added.

| Sieve No. | Per Cent of Total 2,2'-Dichlorohydrazobenzene |
|---|---|
| 40 | 61.9 |
| 60 | 11.9 |
| 80 | .8 |
| 100 | 2.4 |
| Through Sieve No. 100 | 23.0 |

We claim:

1. A process of separating a hydrazobenzene having the formula

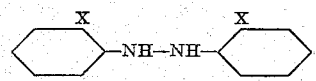

wherein $x$ is a member selected from the group consisting of the hydrogen, halogen, methyl, ethyl, methoxy and ethoxy radicals from an aqueous slurry obtained by reducing the corresponding nitro compound with metallic zinc, which comprises the steps of adding to the slurry in an amount sufficient to dissolve only a small part of the hydrazobenzene, an inert water-immiscible organic solvent for the hydrazobenzene selected from the group consisting of hydrocarbon and halohydrocarbon solvents, said solvent being one which forms with water an azeotrope boiling at a temperature below the melting point of the hydrazobenzene, heating and stirring the resultant mixture whereby crystal growth on the hydrozobenzene is induced; continuing the heating and stirring until the particle size of a major portion of the hydrazobenzene is increased to that size which will be retained on a screen of coarse mesh adapted to pass the remaining solids; and cooling the hydrazobenzene on such a screen.

2. A process of separating a hydrazobenzene having the formula

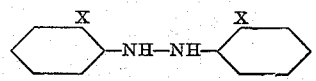

wherein $x$ is a member selected from the group consisting of the hydrogen, halogen, methyl, ethyl, methoxy and ethoxy radicals from an aqueous slurry obtained by reducing the corresponding nitro compound with metallic zinc, which comprises the steps of adding to the slurry in an amount sufficient to dissolve only a small part of the hydrazobenzene, an inert water-immiscible organic solvent for the hydrazobenzene selected from the group consisting of hydrocarbon and halohydrocarbon solvents, said solvent being one which forms with water an azeotrope boiling at a temperature below the melting point of the hydrazobenzene, heating and stirring the resultant mixture whereby crystal growth on the hydrazobenzene is induced; continuing the heating and stirring until the particle size of a major portion of the hydrazobenzene is increased to plus 40 mesh, distilling off said organic liquid, and passing the treated slurry over a screen sufficiently fine to retain substantially all the hydrazobenzene but sufficiently coarse to pass the remaining solids.

3. A process of separating hydrazobenzene from an aqueous slurry, obtained by reducing nitrobenzene with metallic zinc, which comprises the steps of adding to the slurry a sufficient amount of chlorobenzene to dissolve only a small part of the hydrazobenzene; heating and stirring the resultant mixture, whereby crystal growth on the hydrazobenzene is induced; continuing the heating and stirring until the particle size of a major portion of the hydrazobenzene is increased to plus 40 mesh; distilling off said organic liquid; and passing the treated slurry over a screen sufficiently fine to retain substantially all the hydrazobenzene but sufficiently coarse to pass the remaining solids.

4. A process of separating hydrazobenzene from an aqueous slurry, obtained by reducing nitrobenzene with metallic zinc, which comprises the steps of adding to the slurry a sufficient amount of toluene to dissolve only a small part of the hydrazobenzene; heating and stirring the resultant mixture, whereby crystal growth on the hydrazobenzene is induced; continuing the heating and stirring until the particle size of a major portion of the hydrazobenzene is increased to plus 40 mesh; distilling off said organic liquid; and passing the treated slurry over a screen sufficiently fine to retain substantially all the hydrazobenzene but sufficiently coarse to pass the remaining solids.

5. A process of separating 2,2'-dichlorohydrazobenzene from an aqueous slurry, obtained by reducing 1-nitro-2-chlorobenzene with metallic zinc, which comprises the steps of adding to the slurry a sufficient amount of methylene chloride to dissolve only a small part of the 2,2'-dichlorohydrazobenzene; heating and stirring the resultant mixture, whereby crystal growth from the 2,2'-dichlorohydrazobenzene is induced; continuing the heating and stirring until the particle size of a major portion of the 2,2'-dichlorohydrazobenzene is increased to plus 40 mesh; distilling off said organic liquid; and passing the treated slurry over a screen sufficiently fine to retain substantially all the 2,2'-dichlorohydrazobenzene but sufficiently coarse to pass the remaining solids.

HANS Z. LECHER.
GLENN S. WATSON.

REFERENCES CITED

The following references are of record in the file of this patent:

UNITED STATES PATENTS

| Number | Name | Date |
|---|---|---|
| 1,496,586 | Nelson | Oct. 2, 1923 |
| 2,012,234 | Weiland | Aug. 20, 1935 |